Patented July 18, 1933

1,918,622

UNITED STATES PATENT OFFICE

JOHANNES HENDRIK VAN DER MEULEN, OF ARNHEM, NETHERLANDS

PROCESS OF PREPARING IODIDES

No Drawing. Application filed October 13, 1930, Serial No. 488,546, and in Germany October 14, 1929.

In my U. S. Patent No. 1,775,598 issued September 9, 1930, I have described and claimed a process of preparing metal bromides which consists in causing a reaction between bromine and non-acid compounds of the corresponding metals and a reducing agent having the property of conversion into water or gases or both during the process and with no precipitate, and then separating the water or gases or both and the bromide.

I have found that this process cannot be transferred, without more, to the preparing of iodides from iodine. By the interaction of iodine on alkali hydroxides or alkali carbonates in the presence of urea a mixture of iodide and iodate is formed and the urea is not decomposed at all.

Further I have found that formates at ordinary temperature are acting so slowly that applying this reaction on a commercial scale is out of the question especially as it is generally known that in the iodometric analysis of formaldehyde this substance is oxidized to the formate phase only (vide Romyn, Zeitschrift für analytische Chemie, 36 page 18, 1897).

This iodometric reaction which is commonly used in analytical chemistry for determining formaldehyde, proves that the halogens bromine and iodine, although very alike in many respects, are of a very different behavior in several reactions and in their properites. So it is known that ammonia in the presence of alkali will convert bromine into bromide in an easy and quantitative way. With iodine this reaction is quite different yielding iodine-nitrogen compounds which are very explosive. From these known reactions it appears that it is not at all possible to predict the reactions of iodine from those of bromine, and further that these halogens besides general properties according to their place in the so called "periodical system" have a number of special properties which can only be found by experiment or invention.

Although it has appeared that when using urea iodine will not react with this substance, not even at increased temperature, I have found that the oxidation of e. g. formate by iodine may be conducted quantitatively and in a very short time if this reaction is promoted by heating, thus causing a quantitative conversion of the total proportion of iodine into iodide without iodate being formed. This result is very surprising as it could not be expected (in view of the different behavior of the halogens bromine and iodine with respect to the oxidation of urea) that the oxidation reaction would take place in using formate; in this connection it is to be noted that the analytical quantitative iodometric determination of iodine is based on the non-reaction of alkali-iodine mixtures on formates which reaction, as is known, does not go further than the formate phase.

My process may be explained by the following special examples which, however, may be modified in different ways:

1. 1270 grms. of iodine, 230 grms. of formic acid (calculated as 100% acid) and 1000 grms. of pure potassium-bicarbonate are mixed in a vessel of 5 litres and 2 litres of water or of a solution of potassium iodide are added. As soon as the evolution of carbonic acid has stopped the reaction mixture is carefully heated on a water bath; now the reaction continues, new proportions of carbonic acid being evolved. The originally dark brown red liquid is slowly decolorized which proves that the reaction is finished. The solution of iodide prepared in this way is free from iodate and may be brought to crystallization without purification.

2. 1270 grms. of iodine, 340 grms. of sodium formate (waterfree) and 265 grms. of waterfree sodium carbonate are (as in Example 1) heated with 2 litres of water or a solution of sodium iodide until the liquid is completely decolorized. The reaction product is a solution of sodium iodide being free from iodate, this solution yielding pure sodium iodide on evaporation.

3. Into a vessel of 5 litres 250 grms. of formaldehyde of 30% strength (2½ mol), 1270 grms. of iodine and 420 grms. of pure hydroxide of potassium (7½ mol) dissolved in 2 litres of water or in a solution of potassium iodide are successively introduced. The chief reaction, the conversion of formaldehyde into potassium formate goes on already at ordinary temperature, but may be considerably promoted by heating. Thereupon 2½ mol or 250 grms. of potassium bicarbonate or 1¼ mol (172.5 grms.) of potassium carbonate is added, the reaction being finished by heating in a known manner.

4. Into a vessel of 5 litres containing 2 litres of a solution of iodide of calcium or water and 500 grms. (5 mol) of pure carbonate of lime 5 mol of formic acid (230 grms., 100%) are successively introduced. After the evolution of carbonic acid is over 5 mol of iodine (1270 grms.) are introduced. Thereupon this is heated till decolorization is obtained and a solution of pure iodide of calcium is obtained.

It is to be understood that the above examples give the general reaction only and that several modifications may be carried out without departing from the spirit of my invention. One may also use mixtures of the metal compounds mentioned above, and also mixtures of formic acid (or formates) and formaldehyde. In using metal salts as reducing means salts are used of which the cation corresponds with that of the iodide to be prepared.

No claim is made to the reduction action of formaldehyde in as much as the conversion of this substance into formate is concerned. The conversion of so formed formate into carbonic acid and water with simultaneous conversion of the metal into iodide forms a part of my invention although the raw material is formaldehyde and no ready formate.

Not only formic acid and its salts may be used according to my invention but in general all organic reducing means which by the action of iodine in the presence of water are easily converted into carbon dioxide or into carbon dioxide and water. In using oxalic acid or oxalates I proceed preferably as follows:

5. Into a vessel of 5 litres containing 2 litres of potassium iodide solution or water 630 grms. (5 mol) of pure oxalic acid and 690 grms. (5 mol) of pure carbonate of potassium are introduced. Thereupon 1270 grms. (5 mol) of iodine are added and the mixture is heated on a water-bath, a reflux being used. I may also cause a reaction between carbonate of potassium with iodine with e. g. 2000 c.c. of water or of a solution of iodide and thereupon add the oxalic acid successively, the liquid in the vessel being heated in the meantime.

Gases are evolved and finally the solution is completely decolorized; an iodide solution is obtained being completely free from iodate.

I have found that it is of no influence upon the reaction in which sequence the substances are added. For instance: I may first mix the hydroxide or carbonate of potassium with the iodine, yielding a mixture of iodine and iodate:

$$3I_2 + 6KOH = 5KI + KIO_3 + 3H_2O,$$

and thereupon the necessary proportion of formic acid or oxalic acid is added, whereby the iodine is separated and formate or oxalate is formed. The iodine is now reduced by the salts referred to and converted into iodide, carbon dioxide being evolved. This reaction, even at the temperature of the water bath, goes on with very great velocity, which is especially the case if formic acid is used as a reducing agent.

6. Into a vessel 1270 grms. of iodine (5 mol) with 560 grms. of potassium hydroxide (10 mol) (dissolved in 2500 c.c. of water) are introduced and heated if necessary. The iodide, iodate mixture thus formed is heated on the water bath and 230 grms. (5 mol) of formic acid (100%) are added slowly.

Under evolution of gas decolorization takes place and a solution of iodide, free from iodate, is obtained.

From Examples 5 and 6 it appears that in order to obtain a pure iodide solution it is not necessary to start from free iodine, as it is also possible to convert iodate in the presence of iodide by means of formic acid or oxalic acid into iodide in a quantitative way, iodine being formed as an intermediary product.

These reactions further show the considerable differences of character between bromine and iodine with a view to the several reducing agents in an alkaline medium. If bromate is formed when using bromine, the bromate cannot be reduced further and a bromide is formed which is not free from bromate. The conditions are quite different if iodine is used. If, by some cause, a certain proportion of iodate is formed it is possible to reduce the iodate to iodide by introducing further quantities of the reducing means. This is very remarkable as the iodine is less active and all the same it may be brought easier to reduction than the more active bromine.

It is also possible to produce the iodine necessary for the reaction, from a pure iodide iodate mixture by means of hydrogen iodide and to carry out the iodide forming by means of the reduction agents referred to above, metal hydroxides may be added if desired.

These reactions are of importance for factories which prepare iodoform by means of ethyl alcohol as the waste lyes contain formate, iodate and alkali carbonate besides large quantities of iodide.

By special additions the admixtures may be easily removed from these lyes, e. g. by adding to the formate containing iodide lyes iodine and eventually metal hydroxides in such quantities that a complete oxidation of the formate takes place.

The reaction between iodide iodate and formic acid or oxalic acid takes place in such a way that one molecule iodate oxidizes three molecules of the above acids to carbon dioxide and water.

$$KIO_3 + 3HCOOH = KI + 3H_2O + 3CO_2.$$

Of course the full reactions have a more complex nature.

In using formaldehyde and formates one cannot mix the necessary substances without more, as these substances do not separate iodine out of iodide, iodate mixtures and alkaline lye would convert aldehyde into methyl alcohol and formate. When using formaline it is advisable to let alkali react on the mixture of formaline and iodine, as described in Example 3.

All reactions are preferably carried out warm, optionally at the boiling point of the reaction mixture. I may also increase the solubility of iodine in the liquid by adding ready iodide to the reaction mixture, and to decrease the vapor tension so that the evaporation of the halogen is considerably prevented.

My process enables the preparing of pure iodides from iodide, iodate mixtures or from iodine and metal oxides, metal hydroxides or metal carbonates in the presence of water by means of such organic reduction means that besides pure iodides, only carbon dioxide, or carbon dioxide and water are formed. Such reducing means are e. g. formaldehyde, oxalic acid, formic acid, salts of the acids referred to or mixtures of two or more of these substances.

I claim:—

Process of preparing alkali or alkaline earth iodides from iodide iodate mixtures or by the action of iodine upon alkali metal oxides, alkaline-earth metal carbonates, alkali-metal bicarbonates, and alkali metal hydroxides in the presence of water and an organic reducing agent; which comprises adding a reducing agent selected from the group consisting of formaldehyde, formic acid, oxalic acid, and sodium formate, and heating the reaction mixture.

JOHANNES HENDRIK van der MEULEN.